(No Model.)

G. C. EDMUNDS.
HORSESHOE.

No. 424,546. Patented Apr. 1, 1890.

Attest:
Sidney P. Hollingsworth
Horace A. Dodge

Inventor:
George C. Edmunds,
by Dodge Sons,
Attys.

UNITED STATES PATENT OFFICE.

GEORGE C. EDMUNDS, OF BRADFORD, PENNSYLVANIA.

HORSESHOE.

SPECIFICATION forming part of Letters Patent No. 424,546, dated April 1, 1890.

Application filed March 27, 1889. Serial No. 304,968. (No model.)

*To all whom it may concern:*

Be it known that I, GEORGE C. EDMUNDS, a citizen of the United States, residing at Bradford, in the county of McKean and State of Pennsylvania, have invented certain new and useful Improvements in Horseshoes, of which the following is a specification.

My invention has reference to horseshoes; and it consists in constructing the same of elastic or spring metal of any suitable kind in the form of a thin band to encircle or encompass the hoof, except from heel to heel, with a plate to pass under the hoof at the toe, the heels or rear ends of the shoe being drawn to and held in place by bolts passing through the same and through the walls of the hoof at or near the heels, with or without other fastenings, as circumstances may require.

Figure 1:
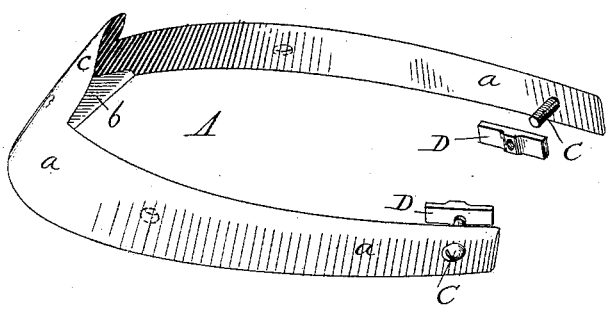
Figure 2:
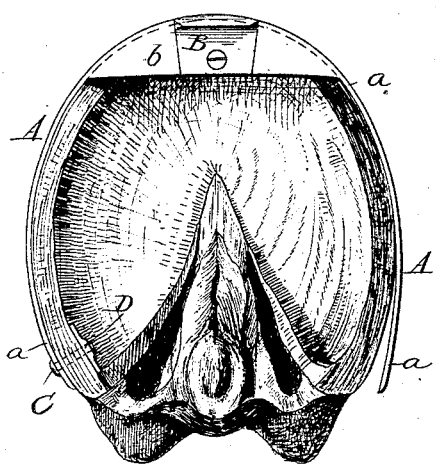
Figure 3:
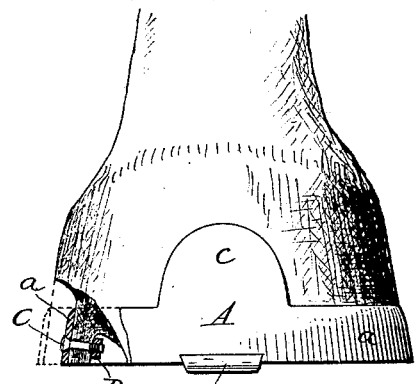
Figure 4:
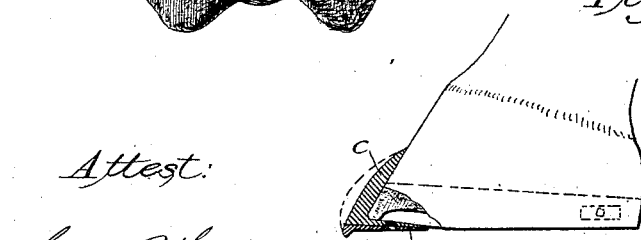

Figure 1 is a perspective view of my improved shoe and its fastening-bolts; Fig. 2, a bottom face view of a hoof with the shoe applied thereto, one of the heels of the shoe being represented as free and sprung away from the hoof; Fig. 3, a front face view of a hoof with the shoe applied, both being shown broken away at one side to the point where the fastening-bolt is applied; Fig. 4, a side view showing the shoe in section and illustrating the manner of forming a toe-weight with or as a part of the shoe.

The plan of shoeing horses now and for many years in vogue is, as is well known, open to many and serious objections, among which are the heaviness of the shoes and consequent interference with or modification of gait, the cramping of the frog and absence of provision for the natural growth of the foot, the frequent injury due to accidental or careless error in driving the fastening-nails, and the difficulty in providing against slipping.

Under my plan the wall of the hoof, except a short space at the toe, is caused to rest directly upon the ground and the frog is permitted either to touch the ground or to come very close thereto. The shoe, being elastic and comparatively thin, will readily spring and adapt itself to the growth of the foot; or, as is preferred, it may be made wider at the heel than the hoof, so that its ends must be sprung inward to fit the hoof, whereby the shoe will be caused to exert a constant spreading action upon the hoof.

Referring now to the illustrations, A indicates the shoe, which consists, essentially, of a band $a$, to encompass the hoof at its front and sides or back to the heels, and a flat horizontal plate $b$, designed to pass under the hoof at the toe and to aid in holding the shoe in position. The band $a$ will vary in dimensions according to the size of the shoe, the weight of the horse upon which it is to be used, the character of the work the animal has to perform, and like considerations; but whatever its size and proportions I prefer that the upper edge of the band $a$ be rounded or beveled, so that when applied to a hoof there shall be no well-defined shoulder at the point of meeting. I also prefer that the band $a$ be formed with an upward extension $c$ at the front to give a better hold upon the hoof, the band being inclined outward at the bottom to correspond with the shape of the hoof. By varying the thickness of this front portion $c$, which variation may be upon a regular and predetermined scale, I am able to secure all the benefits of toe-weights without added expense and without necessity of separate parts or special fastening devices.

In the drawings I have represented the shoe as formed with a dovetail recess in the lower face of the plate $b$ to receive a detachable plate B, which latter may be smooth or furnished with a calk, as desired. By removing one plate and substituting another, change may be easily and quickly made from a smooth shoe to one with a calk of any height or size required. This feature of construction is very old and is not in itself claimed by me, but is illustrated for the purpose of better explaining the general construction and capabilities of my improved shoe.

C C indicate bolts, the heads of which are preferably nicked or slotted to receive a screw-driver, but which may be formed to receive a wrench, if preferred. These bolts pass through holes made in the heel or rear end portions of the band $a$ of the shoe, which holes may be countersunk to receive the heads, if desired.

When a shoe of the above-described construction is to be applied to a hoof, selection is made to secure one of proper form, size, weight, &c., and the shoe is placed in position upon the hoof, with the plate $b$ beneath the toe of the hoof, and the heels of the shoe are then sprung inward against the outer walls of the hoof, which may be conveniently done by means of a pair of tongs or pliers of suitable form; or they may be sprung by hand, one or both at a time, and a mark made upon the hoof at a point corresponding with the hole at the heel of the shoe on each side of the hoof. A hole is then bored through the wall of the hoof, which at the heel is quite thick and solid and affords a firm and safe hold for the fastening bolt. The hole bored, a bolt C is passed through the registering holes of the shoe and of the hoof at one side and screwed into a nut D, which is preferably elongated, as shown in Figs. 1 and 2, to give a long bearing-surface on the inner face or wall of the hoof and to prevent accidental turning of the nut. By turning the bolt the rear end of the band $a$ is drawn toward and held firmly against the hoof, and one side or end being thus fastened the other is secured in the same manner, the bolts as they are turned to place overcoming the spring of the band and carrying the same snugly up against the hoof at all points.

Owing to the elastic or spring-like character of the band $a$, there is a constant tendency to spring apart, which prevents any cramping of the frog and exerts a constant spreading force upon the hoof at the heels. The spring action further serves to produce a constant tension upon the bolts, which effectually prevents them from working loose.

The band $a$, being flush with and outside of the hoof, takes a large share of the wear and prevents chipping or injury of the hoof, but permits the hoof also to take a considerable portion of the wear.

As the narrow edge of the band $a$ wears away a sharp angular edge will be at all times preserved, and thus slipping will be avoided, a result further insured by reason of the edge of the hoof also resting upon the ground.

The shoes are quickly and easily applied and removed, and practical use of them has been made for a time and to an extent sufficient to demonstrate their value and success.

As before intimated, additional screws or other fastenings may be employed at points between the toe and the heels, as indicated by dotted lines in Fig. 1.

Screws, rivets, or like fastenings may take the place of the bolts C, but not to so good advantage.

I am aware that shoes having a horizontal tread to pass under the hoof have been provided with an elastic encompassing band which springs inward upon and clasps the hoof; but this I do not claim. Not only do I omit the tread and employ only a small plate at the front to retain the band in position, but I make the shoe wider at the rear than the hoof to which it is to be applied, so that instead of compressing the hoof it exerts a constant spreading effect. The difference is of great practical importance.

Having thus described my invention, what I claim is—

1. A horseshoe consisting of a metallic band of form and size to encompass and fit closely to the exterior of a hoof at the lower edge of the latter, and provided at its front with an inwardly-projecting plate to pass beneath the toe of the hoof, but otherwise free from inward projection or tread.

2. In combination with a horseshoe consisting of a metallic hoop or band $a$, bent and inclined to conform to the exterior of a hoof and provided at its forward end with an inwardly-projecting plate $b$, bolts C, passing horizontally through the hoop or band $a$ and provided with nuts D.

3. In combination with a horseshoe consisting of a spring metal band $a$, having at its toe or forward end a plate $b$ and normally spread wider at its rear end than the hoof to which it is to be applied, fastening devices, substantially such as described, for securing the heels of the band to the side walls of the hoof.

In witness whereof I hereunto set my hand in the presence of two witnesses.

GEORGE C. EDMUNDS.

Witnesses:
ANDREW P. HIGGINS,
CHARLES G. MILLIGAN.